United States Patent [19]

Jurgich

[11] Patent Number: 4,867,410
[45] Date of Patent: Sep. 19, 1989

[54] DEVICE FOR HOLDING UTENSILS

[76] Inventor: Donald Jurgich, P.O. Box 1575, Poulsbo, Wash. 98370

[21] Appl. No.: 138,346

[22] Filed: Dec. 28, 1987

[51] Int. Cl.⁴ .............................................. A47G 21/14
[52] U.S. Cl. .................................. 248/558; 248/37.3; 248/206.5; 211/70.7
[58] Field of Search ...................... 248/558, 37.6, 121, 248/309.4, 309.1, 316.7, 316.2, 300, 174, 126, 206.5, 117, 89, 90, 152, 37.3; 211/70.1, 70.7, 70.5, 70.6, 128, DIG. 1, 60.1, 70.2, 59.4

[56] References Cited

U.S. PATENT DOCUMENTS

| | | | |
|---|---|---|---|
| 1,055,050 | 3/1913 | Knape | 248/243 |
| 2,178,113 | 10/1939 | Dailey | 248/316.7 X |
| 2,664,005 | 12/1953 | Kosinski | 211/70.7 X |
| 2,796,068 | 6/1957 | Healy | 248/206.5 |
| 2,919,086 | 12/1959 | McMahan | 248/206.5 X |
| 3,005,381 | 10/1961 | Reinholdt | 248/467 |
| 3,329,277 | 7/1967 | Gaudino | 248/206.5 X |
| 3,385,551 | 5/1968 | McKay | 248/467 |
| 3,430,906 | 3/1969 | Danz et al. | 248/126 |
| 3,838,679 | 10/1974 | Welch | 211/70.1 X |
| 4,071,212 | 1/1978 | Burrows et al. | 248/37.6 |
| 4,497,412 | 2/1985 | Labelle | 211/DIG. 1 |
| 4,632,347 | 12/1986 | Jurgich | 211/70.6 X |
| 4,638,786 | 1/1987 | Lucky | 248/206.5 X |

FOREIGN PATENT DOCUMENTS 201910  5/1939  Switzerland ................... 248/37.6

Primary Examiner—Ramon S. Britts
Assistant Examiner—Karen J. Chotkowski
Attorney, Agent, or Firm—Seed and Berry

[57] ABSTRACT

A combination stand/holder having a channel-shaped column with a magnet at the bottom and horizontal front slots for receiving the handles of utensils. A removable back plate on the column of a material attracted by the magnet is adapted to be used as a base plate extending horizontally beyond the column.

7 Claims, 1 Drawing Sheet

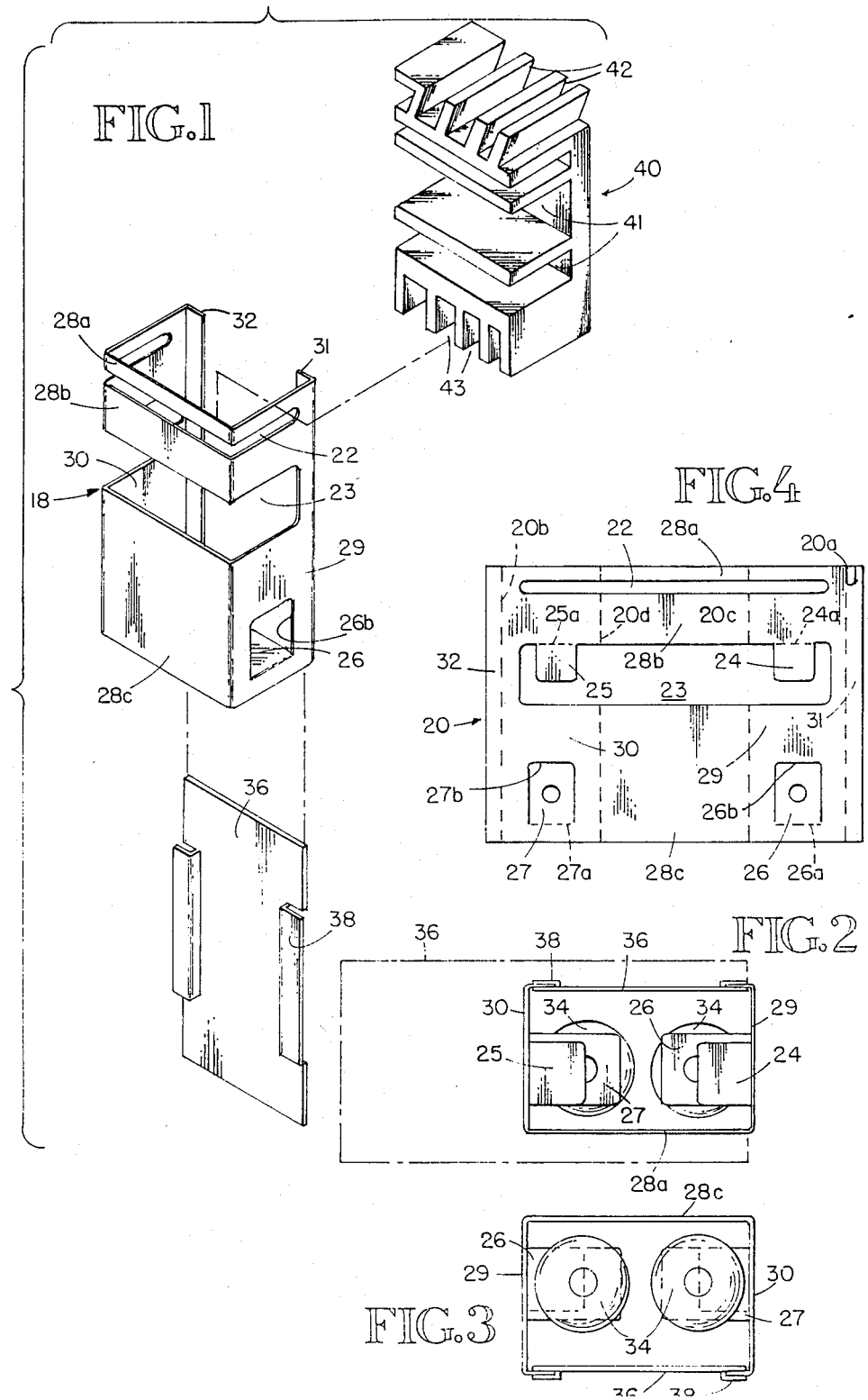

DEVICE FOR HOLDING UTENSILS

TECHNICAL FIELD

The present invention relates to a device for holding utensils, such as a spoon, whisk, beater, fork or spatula, above a stove top or projecting over a pan or the like on a stove, and/or for holding a holder block of the type described and claimed in U.S. Pat. No. 4,632,347 in an elevated position.

BACKGROUND

Commonly, in preparing a sauce, batter, gravy, filling or the like, a cook will from time to time work the ingredients with a suitable utensil and not have a convenient place to set down the utensil between operations without dripping or smearing food being prepared onto a kitchen counter or stove top from the utensil.

In U.S. Pat. No. 4,632,347, there is disclosed a one-piece holding device which is adapted to fit over the upper rim of a pan, bowl or other kitchen container and provide one or more channels to receive and support a utensil handle such that the working part of the utensil will extend over the container.

The present invention provides a device to complement the holding device of U.S. Pat. No. 4,632,347 by selectively holding it in elevated position while also being adapted to serve, not only as a stand, but independently as a holder unit for utensils to hold them above a stove top against which the unit is held upright by a magnet.

BRIEF DISCLOSURE OF THE INVENTION

The combination holder/stand has a vertical, channel-like configuration with horizontal transverse slots through the center web and partway through the side walls for receiving utensil handles, in a generally horizontal position. Partway down from an open top, the device has opposed, horizontal support tabs to limit downward movement of a holder device received through the top. near the bottom, the holder stand has additional opposed, horizontal support tabs to which one or more magnets are secured to keep the unit upright when placed on a stove top, for example. A removable back cover panel is provided that is formed of a magnetically attracted material for use when utensils are also to be held vertically within the channel, or alternatively to be used as a base plate held in place by the magnet(s) for added stability when utensils are held in generally horizontal position.

BRIEF DESCRIPTION OF THE DRAWINGS

In the accompanying drawings:

FIG. 1 is an exploded perspective of the holder/stand together with a complementing holder;

FIG. 2 is a top plan view of the holder/stand with an alternative base position of the back cover shown in phantom;

FIG. 3 is a bottom plan view of the holder/stand; and

FIG. 4 is a plan view of a blank formed with cutouts, and bend lines shown dotted, for making the holder/stand from sheet metal, for example.

DETAILED DESCRIPTION OF THE INVENTION

Referring to the drawings, the combination holder and stand of the present invention has a column 18 of generally channel-like configuration which may be made from a rectangular sheet metal blank 20 having four punch-outs forming an upper, relatively narrow slot 22, a wider, rectangular intermediate slot 23 interrupted by right and left intermediate support tabs 24, 25, and a pair of rectangular bottom support tabs 26, 27 cut on three sides from the blank. The intermediate tabs 24, 25 are bent rearwardly and upwardly along their upper edges 24a, 25a to a horizontal support position, and the lower tabs are bent rearwardly and downwardly along their lower edges 26a, 26b to a horizontal mounting position, leaving cutouts 26b, 27b. Then the blank 20 is bent rearwardly along outer fold lines 20a, 20b and along intermediate fold lines 20c, 20d, forming (a) a front wall with top, intermediate and bottom front wall sections 28a, 28b and 28c separated by slots 22, 23, (b) a pair of right and left side walls 29, 30 interrupted by the slots 22, 23, and (c) a pair of relatively narrow, inturned rear flanges 31, 32.

The described bending of the blank 20 results in the intermediate support tabs 24, 25 being directed by their free ends inwardly toward one another to function as intermediate support flanges at the level of the upper edge of the intermediate slot 23, and the bottom mounting tabs 26, 27 being directed inwardly toward one another adjacent the bottom edge of the holder to function as bottom mounting flanges. Then, a pair of magnets 34, or a single elongated magnet, is attached to the underside of the bottom mounting tabs 26, 27 so that the base of the magnets is at the level of the bottom edge of the column 18. Preferably a back cover or plate 36 is provided which interfits with the rear flanges 31, 32 by way of intermediate offset lips 38 which slidably interfit with the flanges 31, 32. The plate 36 is preferably made of a material attracted by magnets.

The holder column 18 is sized in transverse cross section to receive a holder block 40 of the type shown in FIG. 1 of U.S. Pat. No. 4,632,347 by sliding the block 40 downwardly through the open top of the frame 18 until it seats on the intermediate support tabs 24, 25. As shown in the patent, the block 40 has the shape of a rectangular parallele piped and is formed with three sets of channels, namely, a central set 41 and two parallel end sets 42, 43, extending with their length generally at right angles to the length of the central set. End set 43 extends at right angles relative to the central set 41, whereas the channels of the other end set 42 slope relative to the channels of the central set.

When the holder/stand is used independently of the holder block 40, the slots 22 and 23 function as channels to receive the handles of utensils, such as spoons, spatulas or beaters, and hold them in a generally horizontal position. If the utensil has been used to stir comestibles in a pan, for example, heating on a stove, the holder/stand can be positioned on the stove top adjacent the pan so that any comestible on the utensil can drip into the pan. The magnets 34 are selected to be strong enough to be attracted by iron in the stove structure, and offset the load of the overhanging portion of the cooking utensil. It will be appreciated that utensils can also be held in a generally vertical position preparatory to use by being inserted downwardly through the open top of the combination holder/stand.

In those instances where there is not attraction of the magnets 34 to the stove structure when placed on the stove top, or when the holder/stand is to be placed, for example, on a kitchen counter, the back plate 36 is removed and positioned as a base place for the column 18 in which case the magnets 34 hold the column firmly onto the plate 36. The position of the plate 36 beneath the column 18 can be selected from a centered position to an offset position as shown in phantom in FIG. 2 in which all of the excess in length of the plate 36 over the width of the column 18 between sides 29, 30 projects in one direction beyond the lower end of the column. The latter position is selected when the working end of the utensil and of the utensil being held projects well beyond the column, which would be to the left when the plate 36 is positioned as indicated in FIG. 2.

When used as a stand for holding a holder block 40, the added height of the combination holder/stand permits the holder block 40 to be used alongside taller pans to hold utensils over the pan than would be possible when the column 18 is used separately. When not held by the combination holder/stand, the holder block 40 can be supported directly on the rim of the pan, as described in U.S. Pat. No. 4,632,347.

Although the column 18 has been described as being formed from a sheet metal blank, it will be appreciated the it can be molded in plastic. It will be appreciated that if the combination holder/stand is not to be used to hold a holder block 40 as described, the intermediate support tabs 24, 25 can be eliminated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. Combination holder/stand apparatus comprising:
   an open-ended column having a generally channel-shaped configuration providing a front wall and a pair of opposed side walls joining the front wall, said column being taller than the horizontal width of said front wall;
   a generally horizontal front slot completely through the front wall and continuing as side slots part way through the width of the side walls, said front slot being longer than said side slots, and being adapted to receive an implement;
   a generally horizontal support flange in the upper half of the column extending inwardly from said column as an integral extension thereof at the upper edge of said slots for supporting a holder extension fitting into the upper end of said column;
   a generally horizontal mounting flange near the lower end of the column extending inwardly from the column;
   a magnet attached against the underside of said mounting flange for holding the column in upright position when standing on an object which is attracted by the magnet.

2. Combination holder/stand apparatus according to claim 1 in which said column has a second generally horizontal front slot in the column above the first-mentioned front slot and passing completely through the front wall and continuing as side slots part way through the width of the side walls, said second front slot being narrower than said first-mentioned front slot.

3. Combination holder/stand apparatus according to claim 1 in which there is a pair of generally horizontal mounting flanges near the lower end of the column extending inwardly from the side walls toward one another, and a pair of magnets attached against the underside of said mounting flanges.

4. Combination holder/stand apparatus according to claim 1 in which said column has a pair of opposed flanges extending inwardly from the back of said side walls, and a removable back plate slidably interfitting with said flanges.

5. Combination holder/stand apparatus according to claim 4 in which said back plate is made of a material attracted by a magnet and is adapted to be placed as a base for said column with part of the length of the back plate beneath said magnet and part of said length outwardly offset from one of the side walls of the column.

6. Stand apparatus comprising:
   a portable base plate of a material attracted to a magnet;
   a stand resting on the base plate and having an open upper end and a magnet at a lower end, said base plate extending horizontally in at least one direction beyond said stand and being magnetically attracted to the magnet for holding the stand on the base plate in a selected position, said stand having a pair of upright flanges, said base plate having means for detachably interfitting with said flanges when not being used as a base for the stand; and
   an extension member detachably fitting into said open upper end of said stand.

7. Stand apparatus according to claim 6 in which said stand has a horizontal slot below said extension member, and said extension member has a horizontal slot above said stand, said slots being adapted to receive the handles of implements.

* * * * *